(12) United States Patent
Tweet et al.

(10) Patent No.: US 9,108,738 B1
(45) Date of Patent: Aug. 18, 2015

(54) APPARATUS FOR REFUELING AIRCRAFT

(75) Inventors: Tracy Lee Tweet, Stanwood, WA (US);
Arshad Nazir, Bellevue, WA (US);
Dennis W. Seibold, Stanwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 468 days.

(21) Appl. No.: 12/468,128

(22) Filed: May 19, 2009

(51) Int. Cl.
B64D 37/02 (2006.01)
B64D 37/14 (2006.01)
B64D 37/00 (2006.01)
B64D 37/16 (2006.01)

(52) U.S. Cl.
CPC .............. B64D 37/14 (2013.01); B64D 37/00 (2013.01); B64D 37/16 (2013.01); F17C 2250/043 (2013.01)

(58) Field of Classification Search
CPC ............... B67D 1/0888; F17C 2223/0123; F17C 2250/043; F17C 5/06; Y02E 60/321
USPC ................... 141/236, 237, 242–244, 95; 137/118.01, 119.01; 244/135, 135 A, 244/135 B
See application file for complete search history.

(56) References Cited

U.S. PATENT DOCUMENTS

| 2,771,090 | A | * | 11/1956 | Smith et al. | 137/390 |
|---|---|---|---|---|---|
| 3,724,808 | A | | 4/1973 | Sugden, Jr. | |
| 3,792,713 | A | | 2/1974 | Zadoo | |
| 3,963,044 | A | | 6/1976 | Brown | |
| 4,089,493 | A | * | 5/1978 | Paulson | 244/135 R |
| 4,588,626 | A | | 5/1986 | Cologna et al. | |
| 4,820,564 | A | | 4/1989 | Cologna et al. | |
| 4,961,799 | A | | 10/1990 | Cologna et al. | |
| 5,023,987 | A | | 6/1991 | Wuepper et al. | |
| 5,034,254 | A | | 7/1991 | Cologna et al. | |
| 5,207,541 | A | | 5/1993 | Westerman et al. | |
| 5,337,149 | A | | 8/1994 | Kozah et al. | |
| 5,477,459 | A | | 12/1995 | Clegg et al. | |
| 5,532,933 | A | | 7/1996 | Nakata | |
| 5,590,268 | A | | 12/1996 | Doi et al. | |
| 5,590,900 | A | | 1/1997 | Duran et al. | |
| 5,827,598 | A | | 10/1998 | Larsen et al. | |
| 5,882,756 | A | | 3/1999 | Alston et al. | |
| 6,084,206 | A | | 7/2000 | Williamson et al. | |

(Continued)

FOREIGN PATENT DOCUMENTS

DE 102005025470 A1 12/2006
EP 0359660 A1 3/1990

(Continued)

OTHER PUBLICATIONS

USPTO Office action for U.S. Appl. No. 12/038,352 dated Jul. 20, 2010.

(Continued)

Primary Examiner — Dinh Q Nguyen
Assistant Examiner — Viet Le
(74) Attorney, Agent, or Firm — Yee & Associates, P.C.

(57) ABSTRACT

An apparatus comprises a refueling system for a number of fuel tanks, a primary valve, and a secondary valve. The refueling system has branches capable of distributing fuel into the number of fuel tanks. The primary valve is associated with a primary branch in the branches. The primary valve and the secondary valve are independently controlled to change a distribution of the fuel through the branches into the number of fuel tanks.

23 Claims, 11 Drawing Sheets

(56) References Cited

U.S. PATENT DOCUMENTS

| | | |
|---|---|---|
| 6,174,392 B1 | 1/2001 | Reis |
| 6,182,688 B1 * | 2/2001 | Fabre .......................... 137/503 |
| 6,373,028 B2 | 4/2002 | Williamson et al. |
| 6,579,481 B2 | 6/2003 | Auman |
| 6,618,133 B2 | 9/2003 | Hedges et al. |
| 6,630,993 B1 | 10/2003 | Hedges et al. |
| 6,697,067 B1 | 2/2004 | Callahan et al. |
| 6,736,354 B2 * | 5/2004 | Goto et al. ................ 244/135 C |
| 6,761,783 B2 | 7/2004 | Keller et al. |
| 6,997,415 B2 * | 2/2006 | Wozniak et al. .......... 244/135 C |
| 7,194,326 B2 | 3/2007 | Cobb et al. |
| 7,305,277 B2 | 12/2007 | Freeman et al. |
| 7,361,412 B2 | 4/2008 | Wang et al. |
| 7,368,073 B2 | 5/2008 | Krogager et al. |
| 7,398,698 B2 | 7/2008 | Griess et al. |
| 7,447,598 B2 | 11/2008 | Malkin et al. |
| 7,448,270 B2 | 11/2008 | Kollgaard |
| 7,458,543 B2 | 12/2008 | Cutler et al. |
| 7,467,052 B2 | 12/2008 | Vaccaro |
| 7,617,730 B2 | 11/2009 | Georgeson |
| 7,627,447 B2 | 12/2009 | Marsh et al. |
| 7,657,117 B2 | 2/2010 | Saund et al. |
| 7,703,327 B2 | 4/2010 | Georgeson et al. |
| 7,849,729 B2 | 12/2010 | Miller et al. |
| 7,857,925 B2 | 12/2010 | Keller et al. |
| 7,859,655 B2 | 12/2010 | Troy et al. |
| 7,873,494 B2 | 1/2011 | Hadley et al. |
| 7,886,642 B2 | 2/2011 | Barker et al. |
| 8,044,991 B2 | 10/2011 | Lea et al. |
| 8,197,623 B1 | 6/2012 | Westerman |
| 8,218,852 B2 | 7/2012 | Cork et al. |
| 8,290,753 B2 | 10/2012 | Tryon et al. |
| 8,747,592 B2 | 6/2014 | Stenbaek et al. |
| 2002/0060018 A1 | 5/2002 | Lindsay et al. |
| 2006/0053891 A1 | 3/2006 | Georgeson et al. |
| 2006/0132467 A1 | 6/2006 | Saund et al. |
| 2006/0278761 A1 * | 12/2006 | Cutler et al. .............. 244/135 A |
| 2007/0095140 A1 | 5/2007 | Kollgaard |
| 2007/0100582 A1 | 5/2007 | Griess et al. |
| 2007/0118313 A1 | 5/2007 | Vaccaro |
| 2008/0000299 A1 | 1/2008 | Georgeson |
| 2008/0021882 A1 | 1/2008 | Pu et al. |
| 2008/0148817 A1 | 6/2008 | Miller et al. |
| 2008/0173762 A1 | 7/2008 | Crowley |
| 2008/0177411 A1 | 7/2008 | Marsh et al. |
| 2008/0183402 A1 | 7/2008 | Malkin et al. |
| 2008/0281554 A1 | 11/2008 | Cork et al. |
| 2008/0308210 A1 | 12/2008 | Keller et al. |
| 2009/0000382 A1 | 1/2009 | Sathish et al. |
| 2009/0086014 A1 | 4/2009 | Lea et al. |
| 2009/0086199 A1 | 4/2009 | Troy et al. |
| 2009/0095378 A1 | 4/2009 | Barker |
| 2010/0042361 A1 | 2/2010 | Hadley et al. |
| 2010/0111501 A1 | 5/2010 | Kashima |
| 2010/0229966 A1 * | 9/2010 | Elwart et al. ................. 137/485 |
| 2010/0250148 A1 | 9/2010 | Meredith et al. |
| 2010/0274545 A1 | 10/2010 | Greenberg et al. |
| 2010/0314029 A1 | 12/2010 | Lindgren et al. |
| 2010/0316458 A1 | 12/2010 | Lindgren et al. |
| 2011/0096149 A1 | 4/2011 | Au et al. |

FOREIGN PATENT DOCUMENTS

| | | |
|---|---|---|
| EP | 1102211 A2 | 5/2001 |
| EP | 1400310 A1 | 3/2004 |
| EP | 1965170 A1 | 9/2008 |
| JP | 11207911 A | 8/1999 |
| WO | 0227259 A2 | 4/2002 |
| WO | 2004106847 A1 | 12/2004 |
| WO | 2006060746 A2 | 6/2006 |
| WO | 2009045770 A2 | 4/2009 |
| WO | 2010034014 A2 | 3/2010 |
| WO | 2010147733 A1 | 12/2010 |

OTHER PUBLICATIONS

U.S. Appl. No. 11/863,755, filed Sep. 28, 2007, Lea et al.
Manolakis, "Efficient Solution and Performance Analysis of 3-D Position Estimation by Trilateration", IEEE Transactions on Aerospace and Electronic Systems, vol. 32, No. 4, Oct. 1996, pp. 1239-1248.
Rice et al., "Evaluating Laberation-Based Positioning Algorithms for Fine-Grained Tracking", DIALM-POMC'05, Sep. 2, 2005, Cologne, Germany, 2005 ACM, pp. 54-61.
U.S. Appl. No. 12/038,352, filed Feb. 27, 2008, Hadley et al.
U.S. Appl. No. 61/205,799, filed Jan. 23, 2009, Westerman.
Abdul-Aziz et al., "A CAD Approach to Integrating NDE with Finite Element," National Aeronautics and Space Administration, NASA TM-2004-212904, Apr. 2004, 30 pages.
Abdul-Aziz et al., "Nondestructive Evaluation Correlated with Finite Element Analysis," http://www.grc.nasa.gov/WWW/RT/RT1998/5000/5920aziz.html, Jun. 16, 1999, 5 pages.
Cheng et al., "Parameter Optimization for Bonding Repair of Composite Laminates Based on Neural Network," Computer Simulation, Dec. 2008, vol. 25, Issue 12, 22 pages. (English translation and original Chinese-language article).
Chu et al., "Internet-based Composite Repair," Journal of Composite Materials, May 2005, vol. 39, Issue 9, pp. 827-845.
Frankle, "Application of NDE Data to Finite Element Analysis of Parts Containing Defects," In: Damage Detection in Composite Materials, Masters (Ed.), American Society for Testing and Materials, Philadelphia, PA, 1992, pp. 85-100.
International Search Report, dated Feb. 8, 2010, regarding Application No. PCT/US2008/077178 (WO2009045770), 5 pages.
International Search Report, dated Apr. 6, 2010, regarding Application No. PCT/US2009/057911 (WO2010034014), 5 pages.
International Search Report, dated Aug. 4, 2010, regarding Application No. PCT/US2010/035908 (WO2010147733), 11 pages.
Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.
Vlot et al., "Bonded Aircraft Repairs Under Variable Amplitude Fatigue Loading and at Low Temperatures," Fatigue & Fracture of Engineering Materials & Structures, Jan. 2000, vol. 23, Issue 1, pp. 9-18.
USPTO Notice of Allowance, dated Aug. 23, 2011, regarding U.S. Appl. No. 11/863,755, 10 pages.
USPTO Notice of Allowance, dated Oct. 6, 2010, regarding U.S. Appl. No. 12/235,161, 9 pages.
USPTO Notice of Allowance, dated Sep. 22, 2010, regarding U.S. Appl. No. 12/038,352, 6 pages.
USPTO Office Action, dated Sep. 22, 2011, regarding U.S. Appl. No. 12/690,389, 9 pages.
USPTO Notice of Allowance, dated Feb. 16, 2012, regarding U.S. Appl. No. 12/690,389, 7 pages.
USPTO Office Action, dated Jul. 12, 2011, regarding U.S. Appl. No. 12/410,838, 10 pages.
USPTO Final Office Action, dated Dec. 12, 2011, regarding U.S. Appl. No. 12/410,838, 8 pages.
USPTO Office Action, dated Mar. 19, 2012, regarding U.S. Appl. No. 12/410,838, 7 pages.
USPTO Office Action, dated Apr. 11, 2012, regarding U.S. Appl. No. 12/430,541, 24 pages.
USPTO Office Action, dated Mar. 9, 2011, regarding U.S. Appl. No. 12/485,832, 18 pages.
USPTO Final Office Action, dated Aug. 24, 2011, regarding U.S. Appl. No. 12/485,832, 22 pages.
USPTO Office Action, dated Mar. 29, 2012, regarding U.S. Appl. No. 12/485,832, 22 pages.
Final Office Action, dated Nov. 14, 2013, regarding U.S. Appl. No. 12/430,541, 26 pages.
Alaimo et al., "Global/Local FEM-BEM Stress Analysis of Damaged Aircraft Structures," Computer Modeling in Engineering & Sciences, vol. 36, No. 1, Oct. 2008, pp. 23-41.
Armentani et al., "DBEM and FEM analysis on non-linear multiple crack propagation in an aeronautic doubler-skin assembly," International Journal of Fatigue, vol. 28, No. 5-6, May-Jun. 2006, pp. 598-608.

(56) References Cited

OTHER PUBLICATIONS

Office Action, dated Jun. 30, 2014, regarding U.S. Appl. No. 12/430,541, 50 pages.
Notice of Allowance, dated Oct. 28, 2014, regarding U.S. Appl. No. 12/430,541, 13 pages.
Chou Shih-Pin, "Finite Element Application for Strength Analysis of Scarf-Patch-Repaired Composite Laminates," Dec. 2006, Thesis M.S., Wichita State University, College of Engineering, Dept. of Aerospace Engineering, pp. 1-217.
"Repair of Composite Laminates", Office of Aviation Research, Washington, D.C., Dec. 2000, pp. 1-85.

* cited by examiner

APPARATUS FOR REFUELING AIRCRAFT

BACKGROUND INFORMATION

1. Field

The present disclosure relates generally to aircraft and, in particular, to a method and apparatus for refueling aircraft. Still more particularly, the present disclosure relates to a method and apparatus for controlling the refueling of aircraft and increasing the rate at which refueling may be accomplished.

2. Background

Commercial aircraft and military aircraft may be refueled in between flights on ground, while at airport terminals, and/or at other locations within an airport or airfield. These aircraft are refueled by a fuel delivery system such as, for example, without limitation, an airport hydrant system, a tanker truck, and/or some other type of fuel delivery system. In addition, aircraft are also refueled in flight by aerial refueling tankers. These fuel delivery systems send fuel into fuel tanks in an aircraft through an aircraft refueling system. An aircraft refueling system includes a refueling manifold that distributes fuel to the fuel tanks. The refueling manifold is typically located within the wing structure of an aircraft. In some cases, the refueling manifold may extend to fuel tanks located within the fuselage and/or in the tail of the aircraft. The refueling manifold may have a number of branches that extend from the refueling manifold to a number of individual fuel tanks.

The aircraft fuel tanks may also include a fuel vent system, also referred to as a vent system. This vent system regulates pressure within the fuel tanks. During overfill conditions, fuel, gas, and/or vapors may pass through the fuel vent system to an overfill tank and/or overboard from the aircraft. The overfill tank is a tank where fuel overfill may flow before exiting an aircraft.

Currently, refueling of larger commercial and/or military aircraft can take longer intervals of time than desired. For example, a large air transport aircraft can hold up to around 50,000 gallons of fuel to around 60,000 gallons of fuel. Refueling of this aircraft can take over around an hour at lower refueling pressures even at several hundreds of gallons per minute.

Longer refueling times may cause aircraft to occupy airport terminals for longer durations. Longer refueling times may also cause longer turnaround times of aircraft and increased delays at airports. Further, longer turnaround times and increased delays may increase airport congestion. This airport congestion can increase carbon emissions at an airport and decrease airport safety.

Further, with aerial refueling, longer refueling times lead to longer intervals of time of physical contact between a receiver aircraft and a refueling boom on an aerial refueling tanker. The longer intervals of time of physical contact between the aerial refueling tanker and the receiver aircraft may increase the risk to both aircraft.

Factors that influence refueling times include refueling quantity, refueling rates, and the amount of fuel remaining from a previous flight or in reserve. The upper limits of aircraft refueling rates may depend on protection of the limits of tank bottom pressure during an overfill condition. Protection of the limits of tank bottom pressure, in turn, is dependent on the venting capacity of the vent system to flow fuel. The upper limits of aircraft refueling rates may also depend on the limiting of flow velocities of fuel entering the refueling tanks. For example, limiting flow velocities may limit or prevent electrostatic charge.

Tank bottom pressure is the pressure that is present at the bottom of a fuel tank in the aircraft. The tank bottom pressure limit is the structural limit selected for the fuel tank or wing structure of an aircraft to avoid undesired changes to the structure of the fuel tank or elsewhere in the wing. The tank bottom pressure is highest during an overfill condition due to fuel static head pressure and back pressure. The back pressure is due to fuel flow losses through the vent system as fuel flows to an overfill tank and/or overboard. Tank bottom pressure limits are protected by limiting the refueling rate for each fuel tank to a rate that can flow through the vent system and overboard without producing an undesired increase in back pressure in the tank.

Therefore, it would be advantageous to have a method and apparatus for refueling an aircraft that takes into account one or more of the issues discussed above, as well as possibly other issues.

SUMMARY

In one advantageous embodiment, an apparatus comprises a refueling system for a number of fuel tanks, a primary valve, and a secondary valve. The refueling system has branches capable of distributing fuel into the number of fuel tanks. The primary valve is associated with a primary branch in the branches. The primary valve and the secondary valve are independently controlled to change a distribution of the fuel through the branches into the number of fuel tanks.

In another advantageous embodiment, a refueling system for an aircraft comprises a primary fuel distribution system, a primary valve, a secondary fuel distribution system, and a secondary valve. The primary fuel distribution system comprises a primary branch and a number of branches connected to the primary branch. The primary valve is associated with the primary branch. The secondary fuel distribution system comprises a secondary branch with a first end connected to the primary branch in a location downstream from the primary valve associated with the primary branch and upstream from an opening in the primary branch. The secondary valve is associated with the secondary branch and is controlled independently of the primary valve.

In yet another advantageous embodiment, a method is present for refueling a vehicle. Fuel is sent at a first rate into a refueling system connected to a number of fuel tanks. The refueling system comprises branches capable of distributing the fuel into the number of fuel tanks, a primary valve, and a secondary valve. The primary valve is associated with a primary branch in the branches. The primary valve controls a distribution of the fuel at a first rate through the branches. The secondary valve is associated with a secondary branch in the branches and controls a distribution of the fuel at a second rate through at least a portion of the branches. The primary valve and the secondary valve are independently controlled to change the distribution of the fuel through the branches into the number of fuel tanks. The secondary valve is used to change the first rate to a second rate in response to a number of conditions.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
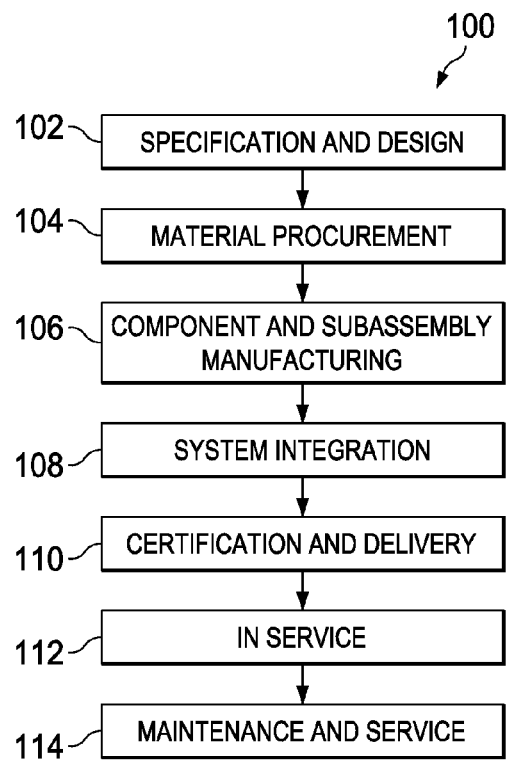
FIG. 1 is a diagram illustrating an aircraft manufacturing and service method in accordance with an advantageous embodiment.
Figure 2:
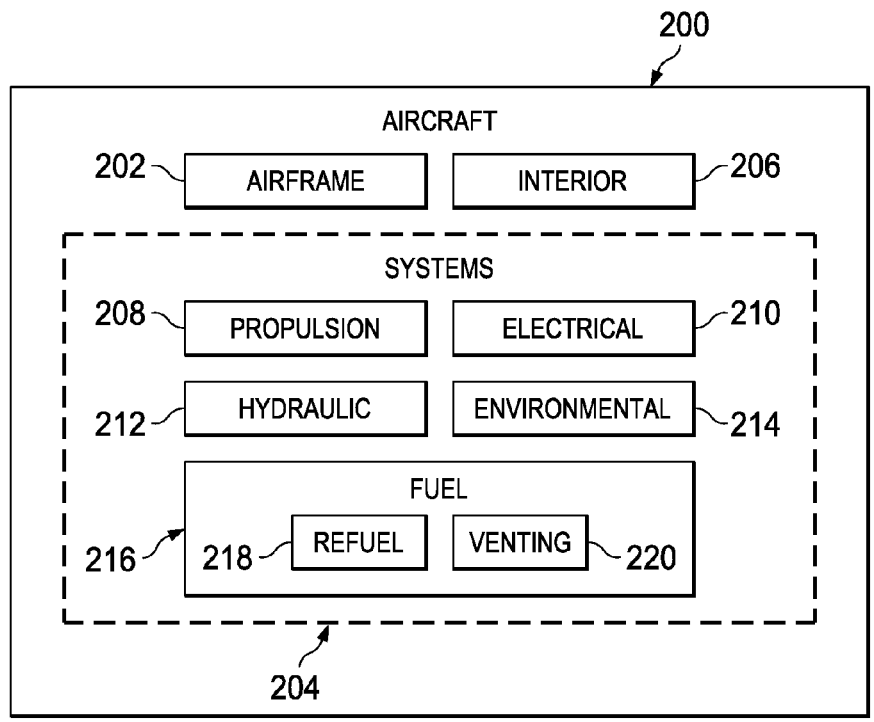
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and fuel system 216. Any number of other systems may be included. Further, each system may be comprised of any number of subsystems. For example, without limitation, fuel system 216 may include refueling system 218 and venting system 220. Although an aerospace example is shown, different advantageous embodiments recognize that the embodiments may be applied to other industries, such as the automotive industry.

Apparatus and methods embodied herein may be employed during any stage of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages such as, for example, without limitation, component and subassembly manufacturing 106 and system integration 108 in FIG. 1. Similarly, one or more of apparatus embodiments, method embodiments, or a combination thereof may be utilized while aircraft 200 is in service 112 or during maintenance and service 114 in FIG. 1.

For example, one or more advantageous embodiments may be implemented during component and subassembly manufacturing 106 in a refueling system for aircraft 200. Other advantageous embodiments may be implemented during maintenance and service 114 as a modification, reconfiguration, or some other change to a refueling system for aircraft 200.

The different advantageous embodiments recognize and take into account a number of different considerations. For example, the different advantageous embodiments recognize and take into account that it is desirable to decrease the amount of time needed to refuel aircraft. This reduction in time may decrease the turnaround time of commercial aircraft. As a result, more flights may be made by an aircraft and/or additional aircraft may be serviced at a particular gate or location.

The different advantageous embodiments recognize and take into account that currently existing solutions for increasing refueling rates and decreasing refueling times may be too expensive, complex, and/or time-consuming. One solution may involve increases in refueling rates by adding an additional refueling valve and branch into a fuel tank. However, the mechanism to operate that additional valve cannot be the same mechanism used to operate the existing valve. Having the same mechanism for both valves may limit the overall refueling rates through the valves to the same rates as without the additional valve.

For example, if an additional valve and branch are added to a fuel system but controlled by the same control input such as, for example, fuel quantity, that operates the existing valves, the control input may be unavailable or may incorrectly indicate the amount of fuel for the entire tank. As a result, all of the valves may stay open, resulting in an overfill or over-pressurization of the tank.

The different advantageous embodiments also recognize that the sizing of the openings or orifices for these valves may be selected such that the fuel rates are no greater than with the original two valves. As a result, increased refueling rates are not achieved. In the different advantageous embodiments, the openings for the valves are internal openings or restrictions within the branches.

The different advantageous embodiments recognize that another solution may involve changing the design of the vent system to increase fuel tank venting and overflow capacity. The different advantageous embodiments also recognize and take into account that this type of change may have disadvantages.

For example, the venting capacity may be limited, and identifying additional venting capacity may be difficult and/or expensive. For example, the structure of stringers in the wing may be such that additional capacity for venting fuel may be unavailable. Further, utilizing additional venting capacity may produce undesirable results such as, for example, increased weight, structural penetrations, and/or other undesirable results. Further, retrofitting an aircraft to include these changes may be expensive and require large amounts of aircraft down time.

The different advantageous embodiments also recognize and take into account that the refueling system in an aircraft may be controlled to lower pressures with restrictions or openings in the valves and/or branches resized based on those lower pressures. For example, currently used refueling systems may have openings associated with each of the valves that take into account an overflow condition at around 50 or 55 pounds-force per square inch gauge. In practice, however, the pressure may often be limited to a reduced maximum fuel pressure delivered by the refueling truck or fuel hydrant system.

The different advantageous embodiments further recognize and take into account that operating a fuel system at reduced pressures may cause around a two-fold reduction in the refueling rate. This reduction may be caused by the reduced pressure and flow of fuel. Further, the maximum fuel pressure limit may result in a more restrictive opening size that may lower refueling rates even more. For example, if the openings are sized for overfill at a maximum fueling pressure of around 45 pounds-force per square inch gauge with these types of refueling systems and the actual fueling pressure is at around 35 pounds-force per square inch gauge, the refueling rate will be higher than if the openings had been sized for overfill at 55 pounds-force per square inch gauge.

The different advantageous embodiments also recognize and take into account that although this type of refueling system may be theoretically practical, the implementation may be difficult. For example, not all aircraft are the same model and may not have the same limitations. Obtaining a certification limit for a level other than what is used in the industry may have certification problems.

The different advantageous embodiments also recognize that the wing structure may be designed to handle higher tank bottom pressures to provide a capability to handle higher overflow rates. This type of change, however, may have weight increases and costs that may be undesirable.

The different advantageous embodiments also recognize and take into account that a control system is used to control the opening and closing of the valves. The valves may be controlled to close or restrict the openings associated with the valves at a higher pressure level that reduces the possibility of an undesired increase in bottom pressure during a vent overflow condition.

Thus, the different advantageous embodiments provide a method and apparatus for refueling an aircraft. In one advantageous embodiment, an apparatus comprises a refueling system for a number of fuel tanks, a primary valve, and a secondary valve. The refueling system has branches capable of distributing fuel into the number of fuel tanks. The primary valve is associated with a primary branch in the branches. The primary valve and the secondary valve are independently controlled to change a distribution of the fuel through the branches into the number of fuel tanks.

In another advantageous embodiment, a refueling system for an aircraft comprises a primary fuel distribution system, a primary valve, a secondary fuel distribution system, and a secondary valve. The primary fuel distribution system comprises a primary branch and a number of branches connected to the primary branch. The primary valve is associated with the primary branch. The secondary fuel distribution system comprises a secondary branch with a first end connected to the primary branch in a location downstream from the primary valve associated with the primary branch and upstream from an opening in the primary branch. The secondary valve is associated with the secondary branch and is controlled independently of the primary valve.

In one or more of the different advantageous embodiments, the second fuel distribution system branches or extends from the first fuel distribution system to provide increased fuel distribution. A secondary valve is included in a second fuel distribution system to control the shutoff in the secondary branch. This control is performed independently of the control mechanism for the primary fuel distribution system in these illustrative examples.

In yet other advantageous embodiments, a primary valve and a secondary valve are included in the primary fuel distribution system. The primary valve and the secondary valve are used to independently control the primary fuel distribution system in these illustrative examples.

Figure 3:
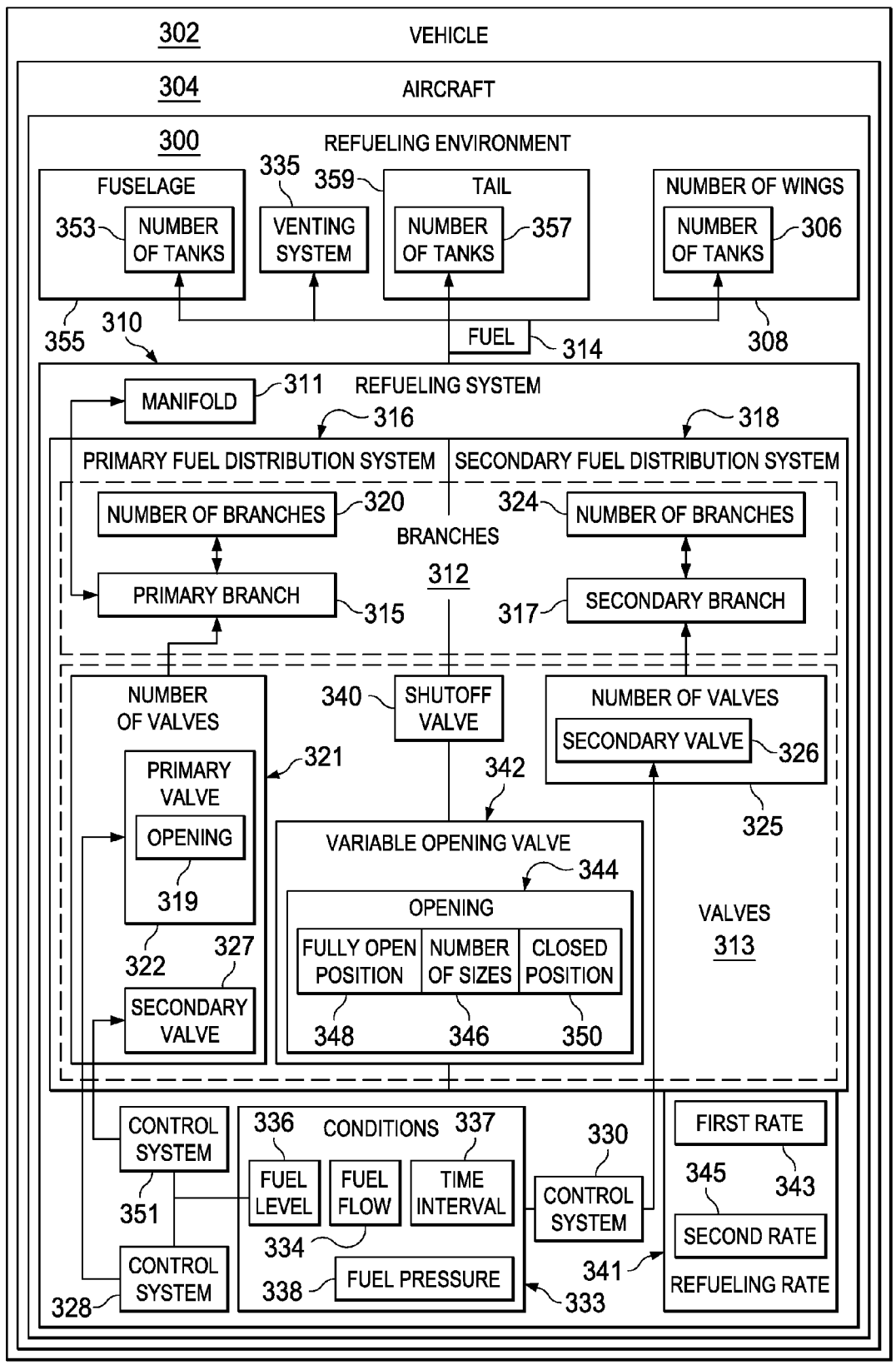
FIG. 3 is a diagram of a refueling environment in accordance with an advantageous embodiment.

Turning now to FIG. 3, a diagram of a refueling environment is depicted in accordance with an advantageous embodiment. Refueling environment 300 may be implemented in vehicle 302. In these illustrative examples, vehicle 302 may take the form of aircraft 304. Aircraft 304 may be implemented using aircraft 200 in FIG. 2.

In these illustrative examples, aircraft 304 has number of tanks 306 that may be located in number of wings 308. Number of tanks 306 may be refueled using refueling system 310. Refueling system 310 is comprised of manifold 311, branches 312, and valves 313. Fuel is sent into aircraft 304 through manifold 311. In these examples, manifold 311 may be a conduit or a number of conduits capable of distributing fuel to number of tanks 306 through branches 312.

Branches 312 may be connected to manifold 311 either directly and/or indirectly. In these illustrative examples, branches 312 may be arranged in a tree-type configuration. In other words, one end of a branch may extend from another branch in this configuration. Further, branches 312 in refueling system 310 may be organized or grouped into primary fuel distribution system 316 and secondary fuel distribution system 318 in the depicted examples.

In these illustrative examples, primary fuel distribution system 316 includes primary branch 315 and number of branches 320 in branches 312 and primary valve 322 in number of valves 321 in valves 313. Primary branch 315 has one end connected to manifold 311 and another end that directly distributes fuel 314 into one of number of tanks 306. Number of branches 320 may be connected to primary branch 315. Further, in these examples, number of branches 320 may be capable of distributing fuel 314 directly or indirectly into one of number of tanks 306.

Primary valve 322 is a valve in number of valves 321 associated with primary branch 315. In these illustrative examples, a valve is associated with a branch by being located at one end of a branch or by being located at a part of the branch between the ends of the branch.

Secondary fuel distribution system 318 may have secondary branch 317 and number of branches 324 in branches 312 and number of valves 325 in valves 313. Secondary branch 317 has one end connected to primary branch 315. In one or more of the advantageous embodiments, secondary branch 317 has another end that directly distributes fuel 314 into number of tanks 306. In other examples, secondary branch 317 may have both ends connected to primary branch 315.

Number of branches 324 may be connected to secondary branch 317. Further, in these examples, number of branches 324 may be capable of distributing fuel 314 directly or indirectly into number of tanks 306. In these illustrative examples, secondary valve 326 in number of valves 325 is a valve associated with secondary branch 317.

In these examples, primary valve 322 is controlled by control system 328, while secondary valve 326 is controlled by control system 330. In other words, primary valve 322 and secondary valve 326 are controlled independently of each other. In this manner, number of valves 325 may be operated based on conditions that may be different from those used to operate number of valves 321.

In these illustrative examples, control systems 328 and 330 may take into account at least one of conditions 333 to control number of valves 321 and number of valves 325. In these illustrative examples, conditions 333 may include fuel flow 334, fuel level 336, time interval 337, fuel pressure 338, and/or other suitable factors. In these illustrative examples, fuel level 336 may be a level of fuel based on a volume of the fuel, a mass of the fuel, and/or a height of the fuel in number of tanks 306. Further, fuel pressure 338 may be the pressure level of fuel 314, gases, and/or vapors.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In the illustrative examples, control system 328 and control system 330 may each be a single component or input signal capable of controlling a number of different valves. In these illustrative examples, control systems 328 and 330 may include, for example, without limitation, a control signal or input, an actuator or actuation system, a control device or mechanism, and/or some other suitable control system. Number of valves 321 is controlled independently from number of valves 325. In addition, valves within number of valves 321 and valves within number of valves 325 may be controlled independently of other valves. In other words, the different valves may be controlled to change the amount of fuel flow based on conditions that may be different from those used to control other valves.

Control system 328 and control system 330 may take various forms. For example, control system 328 and control system 330 may be implemented using a number of fuel level sensors. These fuel level sensors may be mechanical and/or electromechanical systems. For example, the fuel level sensors may identify the fuel level in the fuel tank and transmit an electrical signal over a wire connected to a valve. Other types of sensors such as, for example, without limitation, pressure sensors, timers, and/or other suitable sensors may be used for control systems 328 and/or 330.

In other advantageous embodiments, the control system may include a float operated fuel level control valve having a flow line connected to the valve to control the valve. As the fuel flows through refueling system 310 into number of tanks 306, fuel may travel through the flow line to the float operated fuel level control valve under a certain amount of fuel pressure. When a certain fuel level is reached, a float is actuated to block the flow of fuel through the float operated fuel level control valve. This back up of fuel causes the fuel pressure in the flow line to increase. The pressurization in the flow line, in turn, causes pressurization of the valve actuation mechanism. This pressurization causes the valve to close. Of course, any type of control system may be used, depending on the particular implementation.

In these illustrative examples, valves 313 may take various forms. For example, primary valve 322 may be implemented using shutoff valve 340. Secondary valve 326 in number of valves 325 may be implemented using shutoff valve 340, variable opening valve 342, and/or any other suitable type of valve. Shutoff valve 340 has an on and off state. Variable opening valve 342 has opening 344, which has number of sizes 346 between fully open position 348 and fully closed position 350. In some examples, variable opening valve 342 may not have fully closed position 350.

In these illustrative examples, secondary fuel distribution system 318 may be added to primary fuel distribution system 316 to provide an extension that may allow for quicker refueling rates as compared to when secondary fuel distribution system 318 is not used. Further, the independent control valves within primary fuel distribution system 316 and secondary fuel distribution system 318 may allow for increased fueling rates as compared to currently available refueling systems.

In this illustrative example, primary valve 322 in number of valves 321 is associated with primary branch 315 in number of branches 320 for primary fuel distribution system 316. Primary valve 322, by being associated with primary branch 315, may be located at any portion of primary branch 315. In these examples, primary valve 322 may have opening 319 associated with primary valve 322. Opening 319 may be at a location in primary branch 315 downstream from primary valve 322.

In these illustrative examples, the term downstream refers to a position in a direction of the flow of fuel 314. For example, a location downstream of primary valve 322 is a location away from primary valve 322 in the direction of the flow of fuel 314.

In these examples, opening 319 may be an internal opening within primary branch 315. In other words, opening 319 may be an internal restriction within primary branch 315. Opening 319, in this example, may be an opening of fixed size. For example, without limitation, opening 319 may be formed by the placement of a plate with an orifice in primary branch 315.

An orifice plate may provide a fixed size opening for a valve. The fixed size may be selected based on a maximum amount of fuel flow allowable through primary fuel distribution system 316. The maximum allowed fuel flow may be a limit of fuel flow to prevent tank overpressure conditions from occurring during overfill. For example, a fuel pressure greater than the maximum allowed fuel pressure may lead to undesired fuel flow rates and venting of fuel 314 through venting system 335 beyond a venting capacity. In these examples, the fuel pressure may be the fuel delivery pressure.

Venting of fuel 314 through venting system 335 may result in undesired flow losses through venting system 335. These undesired flow losses may result in undesired increases in tank bottom pressure during the overfill condition. Accordingly, the capacity of venting system 335 may limit refueling rates at the maximum allowed fuel pressure.

Secondary valve 326 in number of valves 325 is associated with secondary branch 317 in secondary fuel distribution system 318. Secondary valve 326, by being associated with secondary branch 317, may be located at any portion of secondary branch 317. Further, secondary branch 317 may have one end connected to primary branch 315 downstream of primary valve 322 and upstream of opening 319 associated with primary valve 322. In these examples, the term upstream refers to a position in a direction against the flow of fuel 314. For example, a location upstream of opening 319 is a location away from opening 319 in a direction against the flow of fuel 314.

In this illustrative example, secondary valve 326 may be controlled independently from primary valve 322 to provide increased rates of fuel distribution into number of tanks 306 as compared to currently used refueling systems. In currently used refueling systems, refueling rates may not be higher than the rates allowed by the maximum allowed fuel pressure and venting capacity of venting system 335. The use of secondary valve 326 with secondary fuel distribution system 318 provides additional flow of fuel 314. This additional flow allows refueling system 310 to surpass the refueling rate limits imposed by the flow capacity of venting system 335.

In other advantageous embodiments, refueling system 310 may have only primary fuel distribution system 316. In these examples, primary fuel distribution system 316 may include secondary valve 327 in addition to primary valve 322. Secondary valve 327 may be associated with primary branch 315. Further, secondary valve 327 may take the place of opening 319 for primary valve 322 and may be at a location downstream from primary valve 322.

In these examples, secondary valve 327 may take the form of shutoff valve 340, variable opening valve 342, and/or some other type of valve. Secondary valve 327 may be controlled by control system 351 independently of primary valve 322. Control system 351 may be a control system similar to control systems 328 and 330. In these examples, control system 351 may control secondary valve 327 based on at least one of conditions 333.

In these illustrative examples, refueling system 310 may deliver fuel 314 to number of tanks 306 at refueling rate 341. The refueling of any of number of tanks 306 may be a two-stage process. In the first stage, primary valve 322 may control refueling rate 341 for refueling system 310 in both primary fuel distribution system 316 and secondary fuel distribution system 318. Primary valve 322 with opening 319 of fixed size may cause fuel 314 to be delivered at first rate 343 in the first stage. In this first stage, fuel 314 may be delivered to the tank through both primary branch 315 and secondary branch 317.

As a selected condition occurs, secondary valve 326 may be used to adjust the flow of fuel 314 through secondary valve 326. This adjustment may change the combined fuel flow through primary branch 315 and secondary branch 317 to second rate 345. Second rate 345 may be a higher rate or lower rate than first rate 343, depending on the change to secondary valve 326.

For example, a closing of or a decrease in the size of an opening for secondary valve 326 restricts the flow of fuel 314 through the corresponding secondary branch 317. This restriction of flow results in a lower rate for second rate 345.

An opening of or an increase in the size of an opening for secondary valve 326 results in a higher rate for second rate 345. In a similar manner, secondary valve 327 may also be used to change refueling rate 341 from first rate 343 to second rate 345.

Changes in secondary valve 326 may change refueling rate 341 by changing the flow rate within secondary fuel distribution system 318. The flow rate within primary fuel distribution system 316 may remain the same with changes in secondary valve 326. On the other hand, changes in secondary valve 327 will result in a change in the flow rate for primary fuel distribution system 316 downstream from secondary valve 327 when secondary valve 327 is placed in line in primary branch 315 of primary fuel distribution system 316.

The illustration of refueling environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional fuel distribution systems, in addition to secondary fuel distribution system 318, may be attached to primary fuel distribution system 316. In yet other advantageous embodiments, additional fuel distribution systems may be connected to manifold 311 with a similar configuration used with primary fuel distribution system 316 and secondary fuel distribution system 318.

In some advantageous embodiments, a plurality of primary valves similar to primary valve 322 associated with a plurality of primary branches similar to primary branch 315 feeding one of number of tanks 306 may each be employed in combination with secondary valves and secondary branches similar to secondary valve 326 and secondary branch 317. These additional valves and branches may be used to achieve multi-rate fueling of the tank in number of tanks 306.

In still other advantageous embodiments, additional valves may be used to control additional branches within primary fuel distribution system 316 and/or secondary fuel distribution system 318. In some advantageous embodiments, fuel 314 may be distributed to number of tanks 353 in fuselage 355 of aircraft 304 and/or number of tanks 357 in tail 359 of aircraft 304.

In some advantageous embodiments, multi-rate fueling may be employed in one of number of tanks 306 that is significantly larger than other tanks in number of tanks 306 to improve the overall fuel flow rate into that larger tank. This improvement reduces overall fueling time for all of number of tanks 306.

Figure 4:
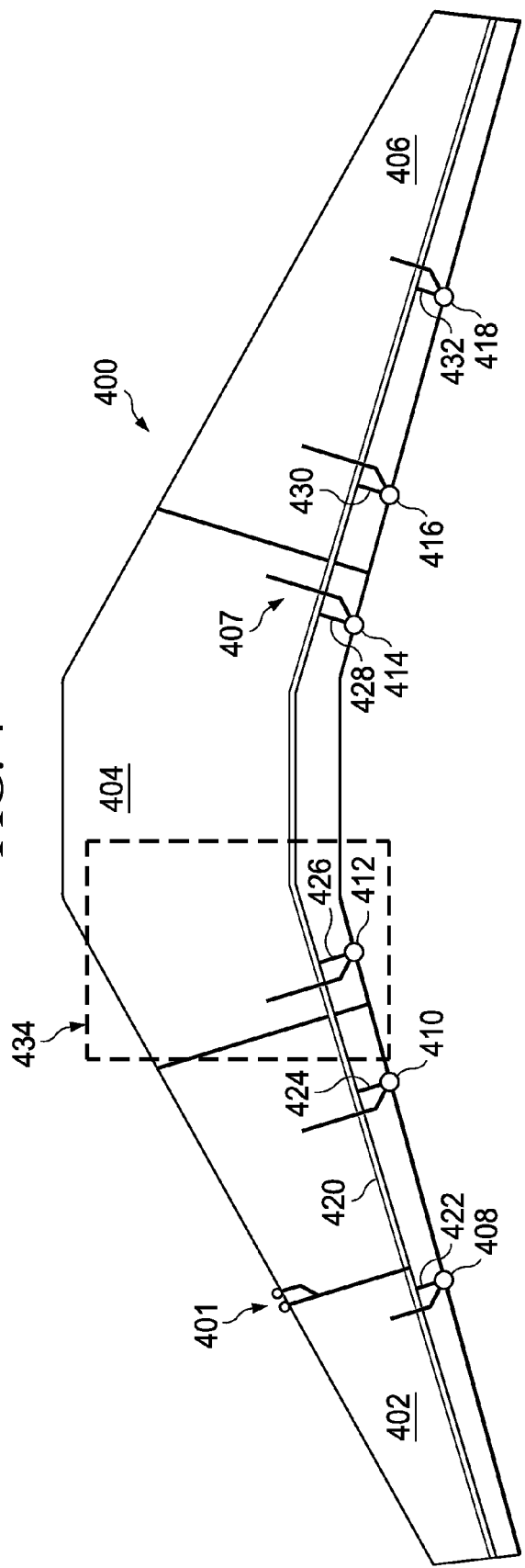
FIG. 4 is a diagram illustrating an arrangement of fuel tanks in accordance with an advantageous embodiment.

Turning now to FIG. 4, a diagram illustrating an arrangement of fuel tanks is depicted in accordance with an advantageous embodiment. In this illustrative example, wing 400 is illustrated for an aircraft such as, for example, aircraft 200 in FIG. 2 or aircraft 304 in FIG. 3. In this illustrative example, wing 400 contains left fuel tank 402, center fuel tank 404, and right fuel tank 406. Of course, in other advantageous embodiments, other numbers of fuel tanks may be present in the wing, the fuselage, and/or the tail of the aircraft. Fuel may be placed into these tanks using refueling system 407.

In these illustrative examples, fuel may be sent from refueling station 401 into manifold 420. Manifold 420 is a conduit that provides for the distribution of fuel in fuel system 407. Primary branches 422, 424, 426, 428, 430, and 432 are connected to manifold 420 and also provide for the distribution of fuel into left fuel tank 402, center fuel tank 404, and right fuel tank 406.

In these examples, primary branches 422, 424, 426, 428, 430, and 432 are associated with primary valves 408, 410, 412, 414, 416, and 418, respectively. Primary valves 408, 410, 412, 414, 416, and 418, along with the restrictions and openings of corresponding primary branches 422, 424, 426, 428, 430, and 432, provide for the distribution of fuel through primary branches 422, 424, 426, 428, 430, and 432 at a particular flow rate. Further, these primary valves take the form of shutoff valves with an on and off state. The shutoff valves permit refuel shutoff at desired quantities for left fuel tank 402, center fuel tank 404, and right fuel tank 406.

In these illustrative examples, section 434 in center fuel tank 404 is shown in more detail with different configurations for refueling system 407 in FIGS. 5-11. The use of identical reference numerals in FIGS. 5-11 represents the same or identical components being present in the different illustrative examples.

Figure 5:
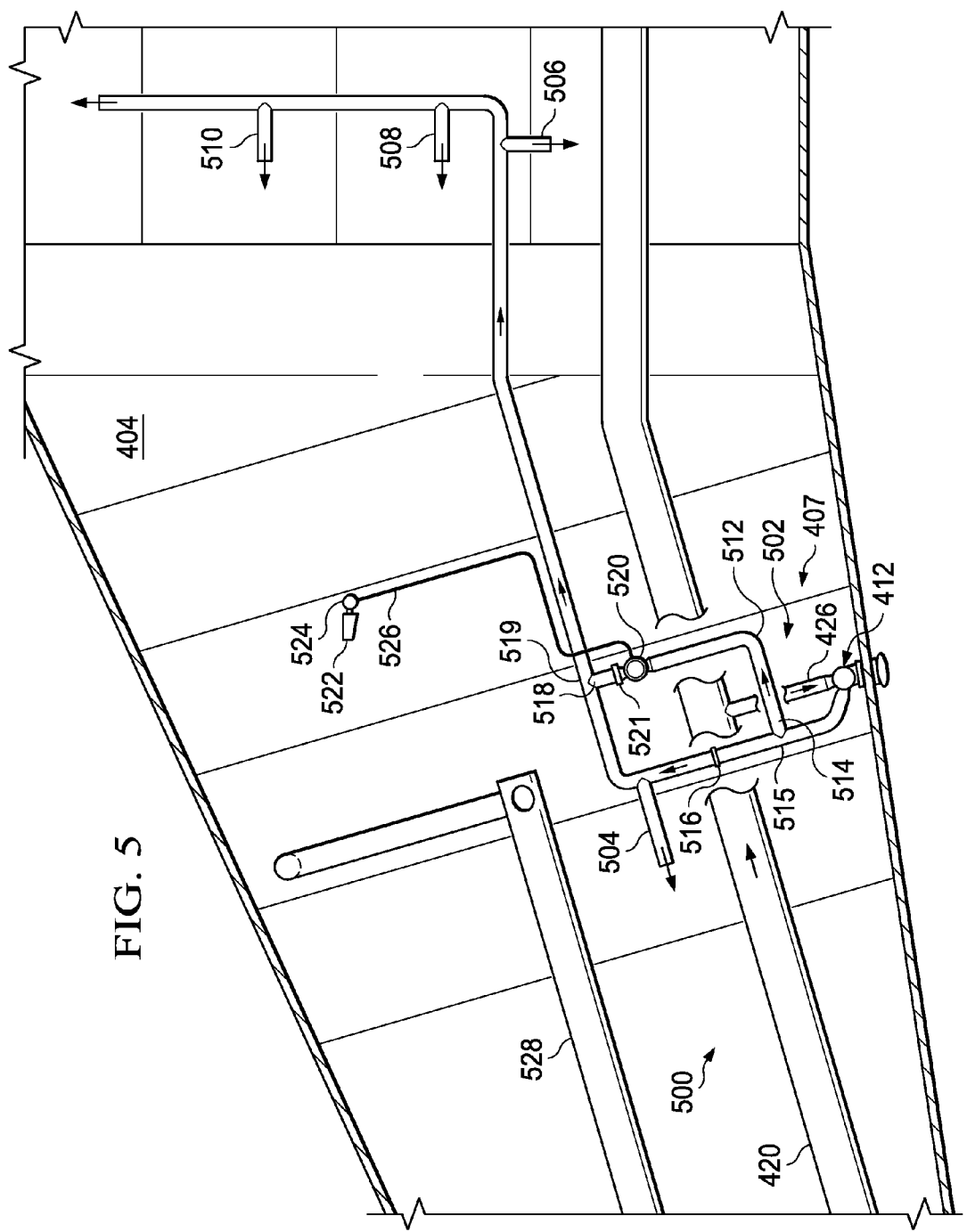
FIG. 5 is a cross-sectional top view of a portion of a fuel tank and a refueling system in a wing in accordance with an advantageous embodiment.

Turning now to FIG. 5, a cross-sectional top view of a portion of a fuel tank and a refueling system in a wing is depicted in accordance with an advantageous embodiment. In this illustrative example, a more detailed illustration of section 434 for center fuel tank 404 is depicted in accordance with an advantageous embodiment.

In this illustrative example, refueling system 407 includes primary fuel distribution system 500 and secondary fuel distribution system 502. As depicted, primary fuel distribution system 500 is formed by primary branch 426, primary valve 412 associated with primary branch 426, branch 504, branch 506, branch 508, and branch 510. Primary branch 426 has one end connected to manifold 420 and one end that directly distributes fuel into center fuel tank 404. Branches 504-510 are connected to and extend from primary branch 426 to distribute fuel. Secondary fuel distribution system 502 is formed by secondary branch 512 and secondary valve 520 associated with secondary branch 512. Secondary branch 512 has both ends connected to primary branch 426 in this example.

In other advantageous embodiments, other numbers of branches may be present for primary fuel distribution system 500 and/or secondary fuel distribution system 502. For example, without limitation, primary fuel distribution system 500 may have primary branch 426 with no branches connected, ten branches connected, or some other number of branches connected to primary branch 426. In other examples, secondary branch 512 may have a number of branches extending from secondary branch 512 downstream of secondary valve 520.

In these illustrative examples, opening 516 is associated with primary valve 412. Opening 516 may be any opening in primary branch 426 of equal or smaller size than primary branch 426. For example, without limitation, opening 516 may be formed with an orifice plate with a fixed size opening. Opening 516 may be sized for a vent overfill condition at the maximum allowed fueling pressure.

In these examples, primary valve 412 regulates the fuel flow rate through primary fuel distribution system 500. Primary valve 412 also controls the fuel flow rate through secondary fuel distribution system 502 when secondary valve 520 is fully open. At lower fueling pressures, the fuel flow rate through primary fuel distribution system 500 downstream of location 515 may be a reduced fuel flow rate. This lower fuel flow rate may be due to the fixed size of opening 516 associated with primary valve 412. At higher fueling pressures, the fuel flow rate through primary fuel distribution system 500 may be higher.

Secondary branch 512 has end 514 and end 518. End 514 of secondary branch 512 is connected to primary branch 426 at location 515 downstream of primary valve 412 and upstream of opening 516. End 518 of secondary branch 512 is connected to primary branch 426 at location 519 downstream of opening 516. In this manner, secondary branch 512 of secondary fuel distribution system 502 rejoins the fuel flow for primary fuel distribution system 500.

In these examples, downstream refers to a position in a direction of the flow of fuel. Upstream refers to a position in a direction against the flow of fuel. For example, a location downstream of primary valve 412 is a location away from primary valve 412 in the direction of fuel flow, and a location upstream of opening 516 is a location away from opening 516 in a direction against the fuel flow.

Secondary valve 520 provides an additional capability to regulate the fuel flow in secondary fuel distribution system 502. In this illustrative example, secondary valve 520 takes the form of a shutoff valve. Secondary valve 520 may have opening 521 associated with secondary valve 520. Opening 521 may be closed in an off state for secondary valve 520 and open in an on state for secondary valve 520. Of course, other types of valves may be used for secondary valve 520, depending on the particular implementation. In other advantageous embodiments, opening 521 may be sized to achieve specific flow rate characteristics through secondary branch 512 apart from the open and closed states of secondary valve 520.

With this configuration in refueling system 407, two-stage refueling may be performed in center fuel tank 404. The first stage may be performed at a first rate of refueling. In the first stage, primary valve 412 may allow distribution of fuel at the first refueling rate through primary fuel distribution network 500 and secondary fuel distribution network 502. Both primary valve 412 and secondary valve 520 are open in the first stage. As a selected condition is encountered, secondary valve 520 may be closed to cut off refueling in secondary branch 512 and secondary fuel distribution system 502 in the second stage of refueling. The selected condition may be, for example, without limitation, a selected pressure, a fuel level, a rate of fuel flow, a time interval, and/or some other condition.

In this illustrative example, secondary branch 512 connected to primary branch 426 provides for a higher refueling rate into center fuel tank 404 when secondary valve 520 is open as compared to when secondary valve 520 is closed.

In these illustrative examples, secondary valve 520 is controlled by control system 522. Control system 522 comprises float operated fuel level control valve 524 and flow line 526. In this manner, secondary valve 520 is controlled independently from primary valve 412. When a selected amount of fuel is present within center fuel tank 404, float operated fuel level control valve 524 may close and allow fuel flow through flow line 526 to back up, pressurizing flow line 526.

This pressurization of flow line 526 may, in turn, pressurize secondary valve 520. In particular, in these examples, pressurization of flow line 526 may pressurize a diaphragm chamber in secondary valve 520. The pressurization of the diaphragm chamber in secondary valve 520 causes secondary valve 520 to close, thereby cutting off the distribution of fuel by secondary fuel distribution system 502 in this illustrative example.

By cutting off fuel flow through secondary fuel distribution system 502, the overall refueling rate of refueling system 407 may be reduced. This level of fuel at which float operated fuel level control valve 524 closes may be selected as a level that prevents venting of fuel through vent system 528 when secondary valve 520 is open. In other advantageous embodiments, secondary valve 520 may take the form of a valve that reduces the rate of fuel flow through secondary fuel distribution system 502 when a selected condition occurs. Venting system 528 is one example of one implementation for venting system 335 in FIG. 3.

Figure 6:
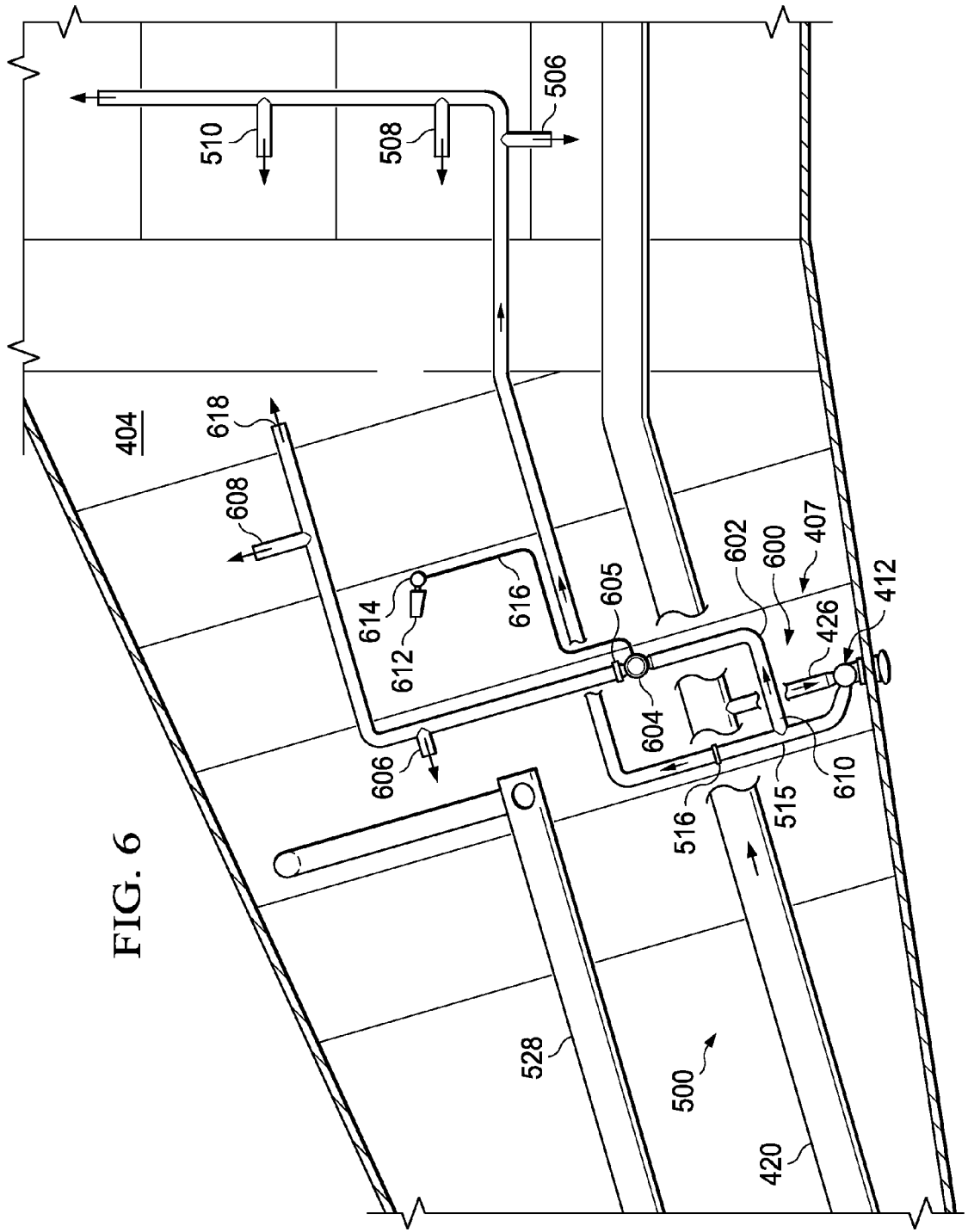
FIG. 6 is a cross-sectional top view of a portion of a tank and a refueling system in a wing in accordance with an advantageous embodiment.

Turning now to FIG. 6, a cross-sectional top view of a portion of a tank and a refueling system in a wing is depicted in accordance with an advantageous embodiment. In this illustrative example, secondary fuel distribution system 600 includes secondary branch 602, secondary valve 604 associated with secondary branch 602, branch 606, and branch 608. Branch 606 and branch 608 are connected to and extend from secondary branch 602 downstream of secondary valve 604.

Secondary branch 602 has end 610 connected to primary branch 426 in location 515 downstream from primary valve 412 and upstream from opening 516. Secondary valve 604 is in the form of a shutoff valve in this illustrative example. Secondary valve 604 may have opening 605 associated with secondary valve 604. Opening 605 may be closed in an off state for secondary valve 604 and open in an on state for secondary valve 604. In other advantageous embodiments, opening 605 may be selected to achieve specific flow rate performance through secondary branch 602 apart from the open and closed states of secondary valve 604.

Secondary valve 604 is controlled by control system 612, which comprises float operated fuel level control valve 614 and flow line 616. Secondary valve 604 is independently controlled from primary valve 412. In this illustrative example, secondary fuel distribution system 600 does not rejoin primary fuel distribution system 500. Instead, secondary fuel distribution system 600 directly delivers fuel to center fuel tank 404 through branches 606 and 608 and end 618 of secondary branch 602. In other words, secondary fuel distribution system 600 delivers fuel to center fuel tank 404 separately from primary fuel distribution system 500.

Figure 7:
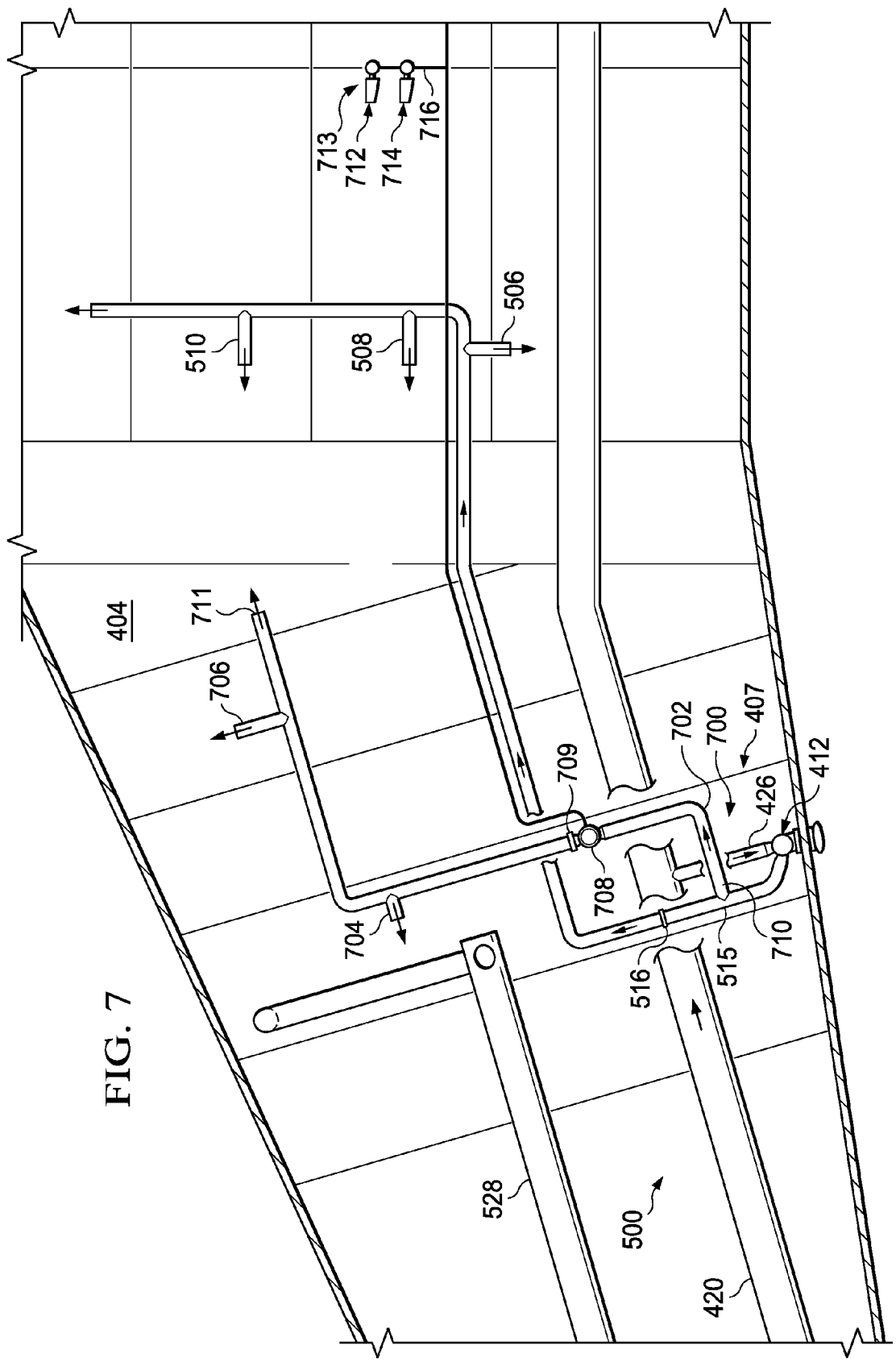
FIG. 7 is a cross-sectional top view of a portion of a fuel tank and a refueling system in a wing in accordance with an advantageous embodiment.

Turning now to FIG. 7, a cross-sectional top view of a portion of a fuel tank and a refueling system in a wing is depicted in accordance with an advantageous embodiment. In this illustrative example, secondary fuel distribution system 700 comprises secondary branch 702, branch 704, branch 706, and secondary valve 708. Secondary valve 708 is associated with secondary branch 702.

Secondary branch 702 has end 710 connected to location 515 of primary branch 426 downstream from primary valve 412 and upstream from opening 516. Secondary fuel distribution system 700 directly delivers fuel to center fuel tank 404 through branches 704 and 706 and end 711 of secondary branch 702.

In this illustrative example, secondary valve 708 is a shutoff valve with opening 709 associated with secondary valve 708. Secondary valve 708 is controlled by control system 713. Control system 713 comprises float operated fuel level control valve 712 and float operated fuel level control valve 714 connected in series with flow line 716. Flow line 716 is connected to secondary valve 708 and controls the opening and closing of secondary valve 708. In other advantageous embodiments, flow line 716 may connect to other valves to permit control of the distribution of fuel in a different part of the aircraft through float operated fuel level control valves 712 and 714 in control system 713.

Figure 8:
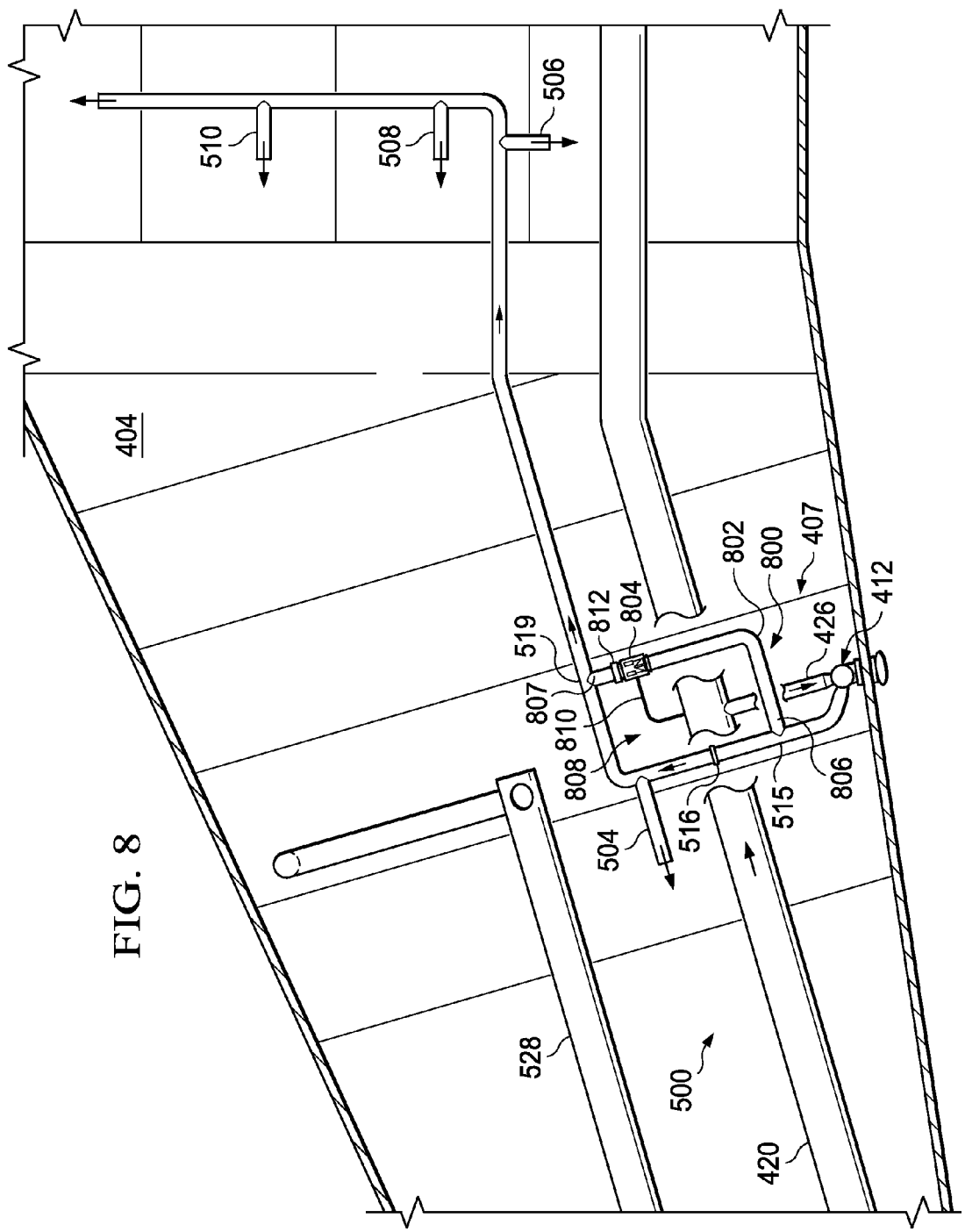
FIG. 8 is a cross-sectional top view of a portion of a fuel tank and a refueling system in a wing in accordance with an advantageous embodiment.

With reference next to FIG. 8, a cross-sectional top view of a portion of a fuel tank and a refueling system in a wing is depicted in accordance with an advantageous embodiment. In this example, secondary fuel distribution system 802 includes secondary branch 800 and secondary valve 804. Secondary branch 800 has end 806 connected to location 515 of primary branch 426 and end 807 connected to location 519 of primary branch 426 in primary fuel distribution system 500.

In this illustrative example, secondary valve 804 is a pressure-regulated valve that may have a variable opening or variable restriction. Secondary valve 804 is controlled by control system 808. Control system 808 comprises pressure line 810, which is connected to secondary valve 804 and manifold 420.

As the pressure changes in pressure line 810, secondary valve 804 may change opening 812 for secondary valve 804 to a number of different sizes between a fully open position and a closed position. For example, opening 812 for secondary valve 804 may have a fully open position at a lowest expected fueling pressure and a fully closed position at the maximum allowed fueling pressure.

When secondary valve 804 is in a fully closed position, fuel may flow only through primary fuel distribution system 500 and may be restricted by opening 516 to protect against exceeding tank pressure limits during overfill conditions. When secondary valve 804 is in a fully open position, fuel may flow through both primary fuel distribution system 500 and secondary fuel distribution system 802. In this case, the overall refueling rate may be no higher than compared to when fuel flows only through primary fuel distribution system 500.

The various sizes for opening 812 of secondary valve 804 at pressures lower than the maximum allowed fueling pressure offset the reduction in fuel flow rate through primary fuel distribution system 500 at these lower pressures. In this manner, secondary valve 804 allows fueling system 407 to achieve, at low fueling pressure, overall refueling rates substantially equal to the higher overall refueling rates achieved at the maximum allowed fueling pressure.

Figure 9:
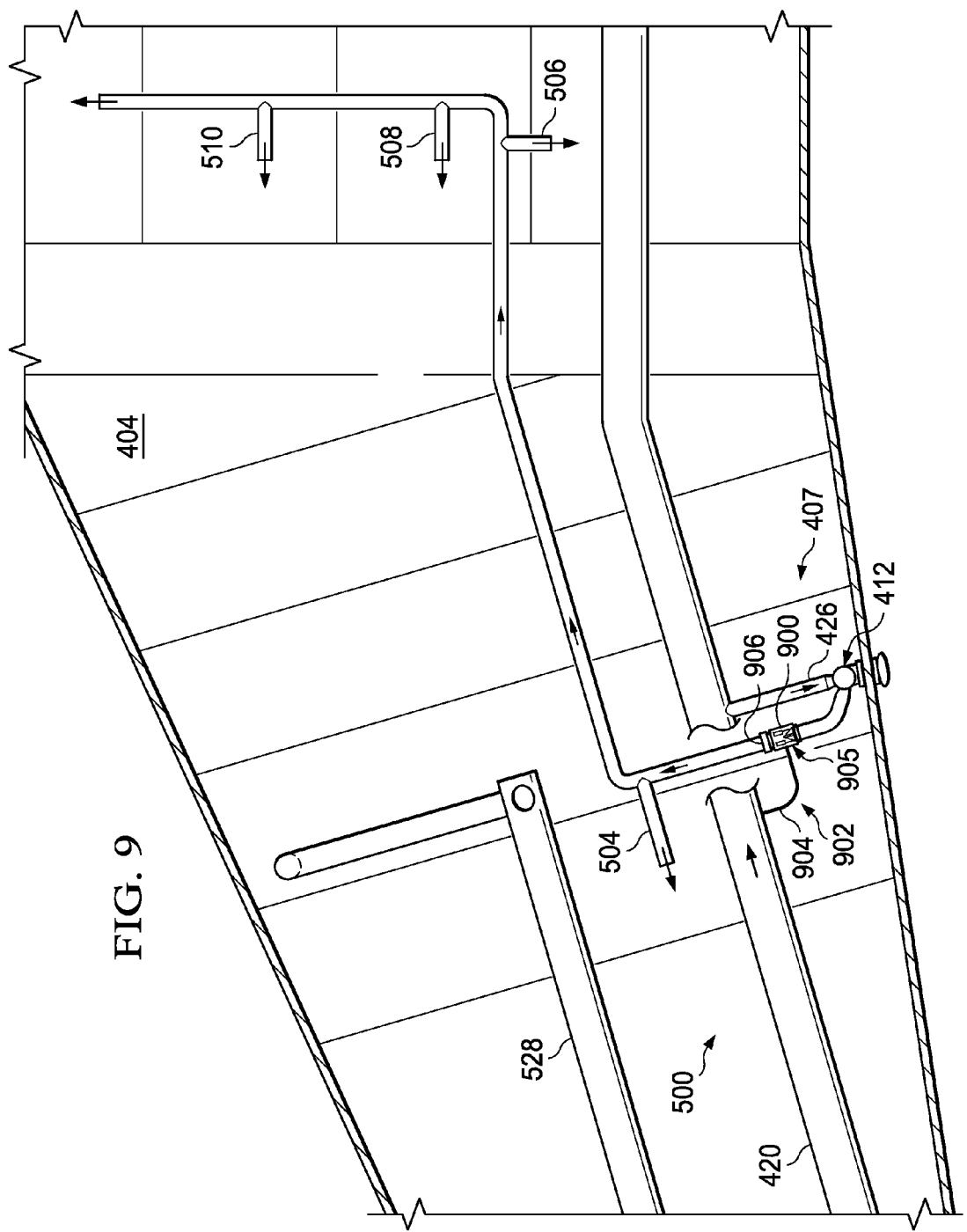
FIG. 9 is a cross-sectional top view of a portion of a fuel tank and a refueling system in a wing in accordance with an advantageous embodiment.

With reference now to FIG. 9, a cross-sectional top view of a portion of a fuel tank and a refueling system in a wing is depicted in accordance with an advantageous embodiment. In this illustrative example, secondary valve 900 is associated with primary branch 426 in primary fuel distribution system 500. Secondary valve 900 is a pressure-regulated valve comprising a variable opening. Secondary valve 900 is operated using control system 902. Control system 902 comprises pressure line 904 that is connected to manifold 420 in fueling system 407. Additionally, pressure line 904 is connected to secondary valve 900.

In these illustrative examples, opening 906 of secondary valve 900 may replace opening 516 in FIGS. 5-8. Further, secondary valve 900 may be at location 905 downstream of primary valve 412 in primary branch 426.

Secondary valve 900 may not have a fully closed state and may always have opening 906 in an open position of a variable size or restriction. Secondary valve 900 is most restrictive with a smaller size for opening 906 at the maximum allowed fueling pressure. Secondary valve 900 is least restrictive with a larger size for opening 906 at the lowest expected fueling pressure. In these examples, the size of opening 906 for secondary valve 900 may vary approximately linearly between the lowest expected fueling pressure and the maximum allowed pressure. In this manner, secondary valve 900 allows fueling system 407 to achieve overall refueling rates substantially equal to the higher overall refueling rates achieved at the maximum allowed fueling pressure, while using lower refueling pressures.

Figure 10:
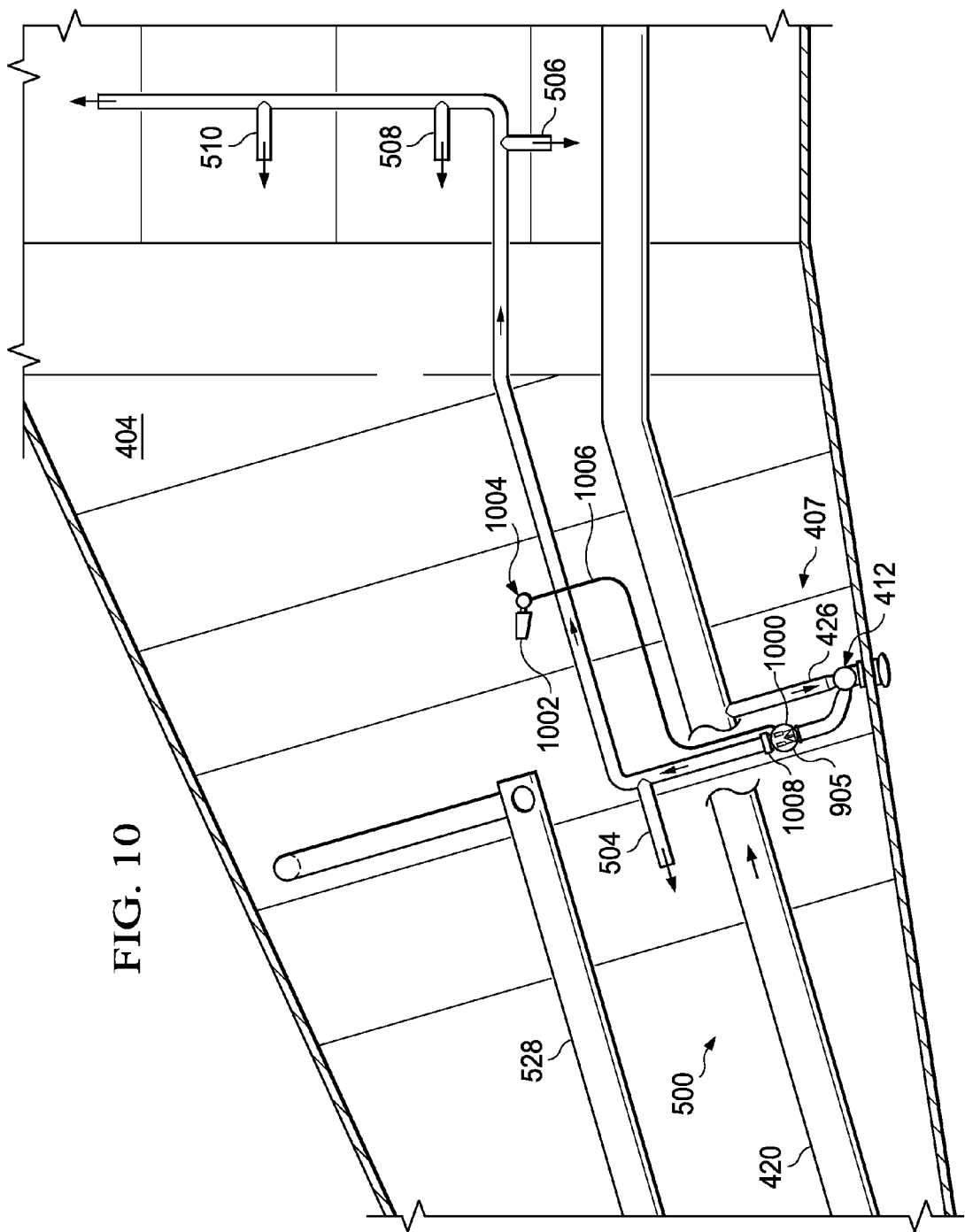
FIG. 10 is a cross-sectional top view of a portion of a fuel tank and a refueling system in a wing in accordance with an advantageous embodiment.

Turning now to FIG. 10, a cross-sectional top view of a portion of a fuel tank and a refueling system in a wing is depicted in accordance with an advantageous embodiment. In this advantageous embodiment, secondary valve 1000 is located at location 905 in primary branch 426 in primary fuel distribution system 500.

Secondary valve 1000 is controlled by control system 1002. Control system 1002 comprises float operated control valve 1004 and flow line 1006. As the fuel level increases to a selected amount, float operated control valve 1004 allows fuel to back up in flow line 1006, pressurizing flow line 1006. The pressurization of flow line 1006 causes secondary valve 1000 to change the size of opening 1008 of secondary valve 1000.

In this illustrative example, opening 1008 of secondary valve 1000 may take the place of opening 516 in FIGS. 5-8. Secondary valve 1000 allows for regulation of the refueling rate independent of primary valve 412. In these examples, secondary valve 1000 has two states. One state is maximum restriction with the smallest size for opening 1008 to protect against overfill conditions. The second state is minimum restriction with the largest size for opening 1008 to provide the desired refueling flow rates. The desired refueling rate may be selected based on any number of conditions.

Figure 11:
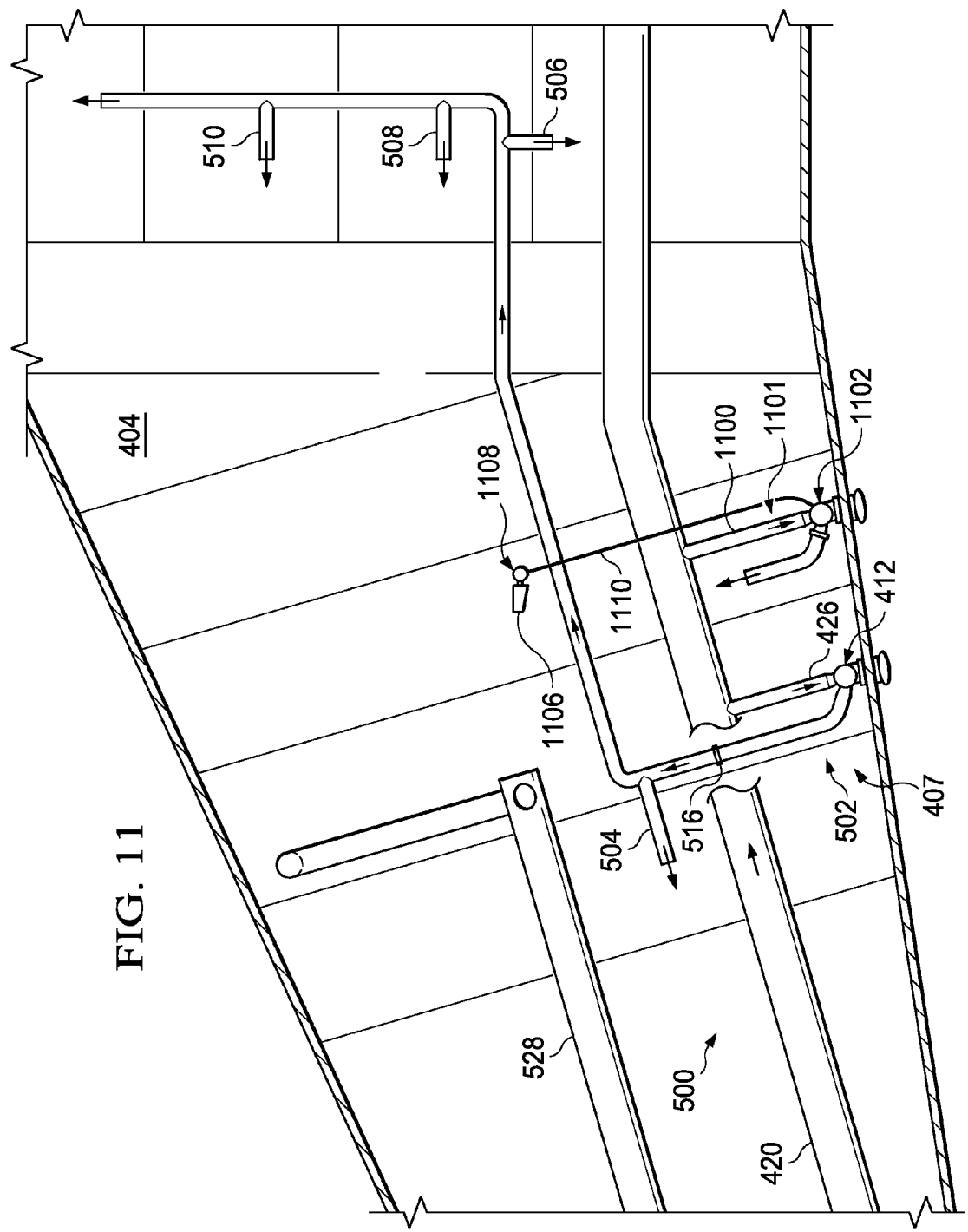
FIG. 11 is a cross-sectional top view of a portion of a fuel tank and a refueling system in a wing in accordance with an advantageous embodiment.

Turning now to FIG. 11, a cross-sectional top view of a portion of a fuel tank with a refueling system in a wing is depicted in accordance with an advantageous embodiment. In this illustrative example, primary branch 1100 is a branch in primary fuel distribution system 1101 connected to manifold 420. Primary fuel distribution system 1101 and primary branch 1100 provide fuel flow in addition to primary fuel distribution system 500 in refueling system 407. Primary fuel distribution system 1101 may be parallel to primary fuel distribution system 500.

In this example, primary valve 1102 is associated with primary branch 1100. Further, in some advantageous embodiments, primary branch 1100 may be part of a parallel primary fuel distribution system with a number of branches (not shown) connected to primary branch 1100 that distribute fuel to center fuel tank 404. In this illustrative example, primary valve 1102 may take the form of a shutoff valve. This valve may allow for a higher level of fuel to flow from manifold 420 to center fuel tank 404 as compared to primary valve 412 alone.

Primary valve 1102, in this illustrative example, receives control input from both shared and independent sources. Primary valve 1102 is controlled independently from primary valve 412 using control system 1106. This independent control cuts off flow through primary branch 1100 at a level that prevents vent overfill at a high flow rate. Control system 1106 includes float operated control valve 1108 and flow line 1110. Flow line 1110 connects float operated fuel level control valve 1108 to primary valve 1102.

Further, in this illustrative example, primary valve 1102 and primary valve 412 may also be controlled by an additional control system (not shown). This control system may provide fuel shutoff capabilities at fuel levels below the full capacity of the fuel tanks. This separate control system allows partial refueling of fuel tanks and is necessary because primary branch 1100 is connected directly to manifold 420 and not downstream of primary valve 412.

The different configurations for refueling system 407 in FIGS. 5-11 provide a capability to refuel an aircraft faster than currently available refueling systems. One or more of the configurations provide a capability to refuel an aircraft with a plurality of stages. For example, two-stage refueling may be performed in center fuel tank 404. The first stage may be performed using a higher rate of refueling as compared to the second stage. The configuration of refueling system 407 can provide a faster distribution of fuel as compared to currently used refueling systems. Also, the use of valves that are independently controlled can provide a capability to provide different refueling rates in which the rates are reduced as the fuel tanks fill up.

The illustrations of the fuel distribution systems in FIGS. 5-11 are example implementations for refueling environment 300 in some advantageous embodiments and are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional valves may be present within the primary and/or secondary fuel distribution systems. These valves also may be independently controlled to maximize or increase the rate at which fuel may be placed into left fuel tank 402, center fuel tank 404, and right fuel tank 406. In yet other advantageous embodiments, other numbers of fuel tanks may be present. In still other advantageous embodiments, two fuel tanks may be present or a single fuel tank may be present.

Further, in yet other advantageous embodiments, other types of control systems may be used. For example, instead of a float operated control valve and a flow line, a sensor attached to an electrical or optical cable may be used, depending on the implementation.

Figure 12:
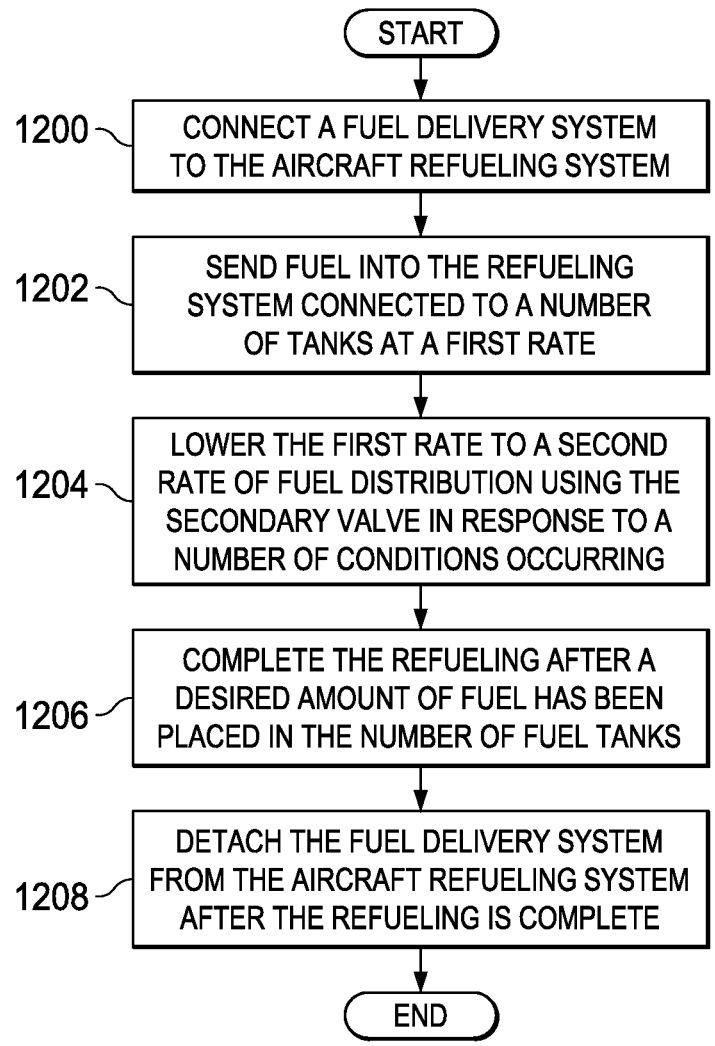
FIG. 12 is a flowchart of a process for performing a refueling operation in accordance with an advantageous embodiment.

Turning now to FIG. 12, a flowchart of a process for performing a ground refueling operation is depicted in accordance with an advantageous embodiment. The process illustrated in FIG. 12 may be implemented using a refueling system such as, for example, refueling system 310 in FIG. 3.

The process begins by connecting a fuel delivery system to the aircraft refueling system (operation 1200). An operator may use a fuel gauging system to input a desired fuel amount or, alternatively, may choose to monitor fuel delivery on a ground fuel flow meter. The process then sends fuel into the refueling system connected to a number of tanks at a first rate (operation 1202). This first rate is an overall refueling rate for the refueling system. The refueling system comprises a manifold, branches capable of distributing the fuel into the number of fuel tanks, a primary valve associated with a primary branch in the branches, and a secondary valve associated with a secondary branch in the branches. The primary valve controls distribution of fuel through at least a portion of the branches. The primary valve and the secondary valve are independently controlled to change the distribution of fuel through the branches into the number of fuel tanks. The secondary valve controls distribution of fuel through another portion of the branches. This other portion of the branches may include the portion of branches controlled by the primary valve.

The first rate is lowered to a second rate of fuel distribution using the secondary valve in response to a number of conditions occurring (operation 1204). This number of conditions may be at least one of a fuel level, a fuel flow rate, a pressure, and/or some other suitable condition.

The refueling completes after a desired amount of fuel has been placed in the number of fuel tanks (operation 1206). After the refueling is complete, the fuel delivery system is detached from the aircraft refueling system (operation 1208), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

In this manner, the different advantageous embodiments provide a method and apparatus for refueling a vehicle. In these examples, the apparatus may include a refueling system for a number of fuel tanks in which the refueling system has branches capable of distributing fuel into the number of fuel tanks. A first valve is associated with a first branch in the branches. A second valve is associated with a second branch in the branches. The first valve and the second valve are independently controlled to change a distribution of fuel through the branches into the number of fuel tanks.

The description of the different advantageous embodiments has been presented for purposes of illustration and description and is not intended to be exhaustive or limited to the embodiments in the form disclosed. Many modifications and variations will be apparent to those of ordinary skill in the art. For example, the different advantageous embodiments are described with respect to a vehicle in the form of an aircraft. In other advantageous embodiments, the refueling system may be implemented in other types of vehicles. For example, the refueling system, in these examples, may be implemented in a spacecraft, a space shuttle, a submarine, and/or some other suitable type of vehicle.

Further, different advantageous embodiments may provide different advantages as compared to other advantageous embodiments. While one or more of the embodiments may provide advantages in reduction of fueling time, one or more of the other embodiments may be more advantageous with respect to weight, cost, ease of assembly, impact to structure, and/or other factors. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a number of fuel tanks, each fuel tank in the number of fuel tanks comprising a number of branches;
a refueling system for the number of fuel tanks, wherein the refueling system has a manifold configured to supply fuel to the number of fuel tanks through the number of branches, each of the number of branches comprising:
a primary branch in the number of branches, the primary branch connected to the manifold at a first end of the primary branch, a second end of the primary branch providing fuel to a fuel tank in the number of fuel tanks;
a primary valve associated with the primary branch downstream of the first end of the primary branch;
an orifice plate positioned in the primary branch downstream of the primary valve, the orifice plate sized for a vent overfill condition at a maximum allowed fueling pressure;
a secondary branch having a first end and a second end, each end connected to the primary branch, wherein a first end of the secondary branch is connected to the primary branch in a location downstream from the primary valve and upstream from the orifice plate in the primary branch and the second end of the secondary branch is positioned downstream from the orifice plate; and
a secondary valve associated with the secondary branch, between the first end and the second end of the secondary branch, wherein the primary valve and the secondary valve are independently controlled, and wherein the secondary valve is downstream from the primary valve.

2. The apparatus of claim 1, wherein an opening in the primary branch has a size equal to or smaller than a size of the primary branch.

3. The apparatus of claim 1, wherein the primary valve and the secondary valve are operated based on at least one of a rate of fuel flow, a fuel level, a time interval, and a pressure.

4. The apparatus of claim 1, wherein at least one of the primary valve and the secondary valve is selected from one of a shutoff valve and a variable opening valve.

5. The apparatus of claim 1, wherein the primary branch comprises a primary distribution system and the secondary branch comprises a secondary distribution system.

6. The apparatus of claim 1 further comprising:
a number of branches connected to the primary branch downstream from the opening in the primary branch, wherein the number of branches connected to the primary branch and the primary branch comprises a first distribution system.

7. The apparatus of claim 1, wherein the secondary valve has a variable opening capable of having a number of sizes between a fully open position and a closed position.

8. The apparatus of claim 1, wherein the secondary valve is operated based on at least one of a rate of fuel flow, a fuel level, a time interval, and a pressure.

9. The apparatus of claim 8, wherein the secondary valve has a variable opening capable of having a number of sizes between a fully open position and a closed position in response to at least one of the rate of fuel flow, the fuel level, the time interval, and the pressure.

10. The apparatus of claim 1, wherein the secondary valve is a shutoff valve.

11. The apparatus of claim 1, wherein the secondary valve is connected to at least one of a fuel level sensor, a fuel flow sensor, a timer, and a pressure sensor.

12. The apparatus of claim 1, wherein the refueling system is located in a vehicle selected from one of an aircraft, a spacecraft, a space shuttle, a ship, and a submarine.

13. The apparatus of claim 1, wherein the refueling system is located in a storage vessel or tank.

14. The apparatus of claim 1, wherein the primary valve and the secondary valve are associated with a first fuel tank in the number of fuel tanks.

15. The apparatus of claim 1 further comprising:
a number of primary valves associated with a number of primary branches, each primary branch in the number of primary branches connected to the manifold; and
a number of secondary valves associated with a number of secondary branches in the branches, wherein each secondary branch in the number of secondary branches is connected to a corresponding primary branch in the number of primary branches downstream from a corresponding primary valve in the number of primary valves.

16. The apparatus of claim 15, wherein the number of primary valves and the number of secondary valves are independently controlled.

17. The apparatus of claim 15, wherein each primary valve in the number of primary valves is associated with a corresponding single fuel tank in the number of fuel tanks, but wherein each fuel tank in the number of fuel tanks is associated with one or more primary valves in the number of primary valves.

18. The apparatus of claim 15, wherein each primary valve in the number of primary valves is independently controlled to change a distribution of the fuel into a corresponding single fuel tank in the number of fuel tanks, but wherein fuel flow to each fuel tank in the number of fuel tanks is changed by one or more primary valves in the number of primary valves.

19. The apparatus of claim 1, wherein the primary valve and the secondary valve are independently controlled to change a distribution of the fuel into a first fuel tank in the number of fuel tanks.

20. The apparatus of claim 1, wherein the primary valve controls fuel flow through the secondary branch.

21. The apparatus of claim 1 further comprising a first controller and a second controller, the first controller configured to control the primary valve and the second controller configured to control the secondary valve, the first controller controlling the primary valve independent of the second controller controlling the secondary valve.

22. The apparatus of claim 1, wherein the primary valve transitions between an open position and a closed position, and the secondary valve transitions between an open position and a closed position, and wherein the apparatus is configured to provide a higher fueling rate to a fuel tank when the primary valve and the secondary valve are open compared to when the primary valve is open and the secondary valve is closed.

23. The apparatus of claim 1, further comprising a second orifice plate in the secondary branch positioned downstream of the secondary valve.

* * * * *